(12) United States Patent
Hwang

(10) Patent No.: US 6,545,730 B1
(45) Date of Patent: Apr. 8, 2003

(54) THIN FILM TRANSISTOR ARRAY PANEL FOR A LIQUID CRYSTAL DISPLAY AND A METHOD FOR MANUFACTURING THE SAME

(75) Inventor: Jang-Won Hwang, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/438,579

(22) Filed: Nov. 12, 1999

(30) Foreign Application Priority Data

Nov. 12, 1998 (KR) .............................. 98-48364

(51) Int. Cl.[7] ...................... G02F 1/136; G02F 1/1343; G02F 1/1333
(52) U.S. Cl. .............................. 349/43; 349/38; 349/39; 349/110
(58) Field of Search ............................ 349/43, 42, 44, 349/38, 39, 110

(56) References Cited

U.S. PATENT DOCUMENTS

| | | | | |
|---|---|---|---|---|
| 5,742,363 A | * | 4/1998 | Bae .............................. | 349/38 |
| 6,118,506 A | * | 9/2000 | Yamazaki et al. .......... | 349/111 |
| 6,281,953 B1 | * | 4/2001 | Lee et al. ..................... | 349/43 |
| 6,275,278 B1 | * | 8/2001 | Ono et al. .................... | 349/152 |
| 6,330,042 B1 | * | 12/2001 | Kang et al. ................... | 349/43 |
| 6,330,044 B1 | * | 12/2001 | Murade ....................... | 349/44 |
| 6,337,234 B2 | * | 1/2002 | Ha et al. ..................... | 438/161 |
| 6,344,885 B1 | * | 2/2002 | Mori et al. ................... | 349/44 |
| 6,365,916 B1 | * | 4/2002 | Zhong et al. ................. | 257/59 |

\* cited by examiner

*Primary Examiner*—Robert H. Kim
*Assistant Examiner*—Mike Qi
(74) *Attorney, Agent, or Firm*—McGuireWoods LLP; Hae-Chan Park

(57) ABSTRACT

A polysilicon layer including a channel region, and a source region and a drain region located on opposite sides of the channel region is formed on a lower insulating substrate. A gate wire including a plurality of gate lines and a plurality of gate electrodes, which are branched from the gate lines and overlap the channel region, and a storage wire including a plurality of storage electrodes and storage lines connected to the storage electrodes and parallel to the gate lines are formed on the gate insulating layer covering the polysilicon layer. Furthermore, a plurality of first insulating layers covering the gate wire and the storage wire are formed on the gate insulating layers. The first insulating layer has the same shape as the gate insulating layer and is formed extending to the gate wire and the storage wire. A pixel pattern including source and drain ITO electrodes made of indium tin oxide are formed on the exposed source and drain regions, and a pixel electrode connected to the drain ITO electrode is formed on the insulating substrate. Here, longitudinal edge portions of both sides of the pixel electrode overlap edge portions of storage electrodes, respectively. A second insulating layer if formed covering the source and drain ITO electrodes and the pixel electrode, and having a contact hole exposing a portion of the source ITO electrode. A plurality of data lines connected to the source ITO electrode through the contact hole and defining pixels by intersecting the gate lines is formed on the second insulating layer. The data lines are located between adjacent pixel electrodes and overlap the storage electrodes.

17 Claims, 4 Drawing Sheets

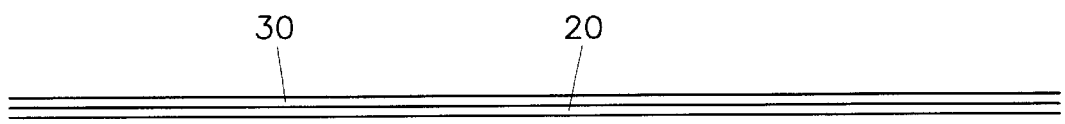
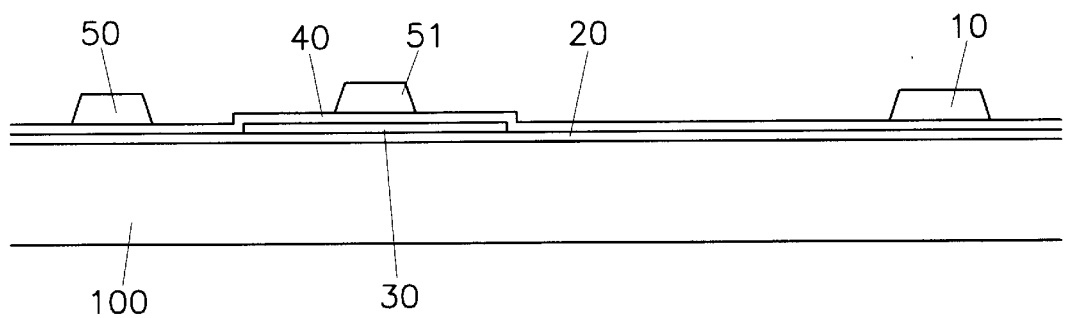
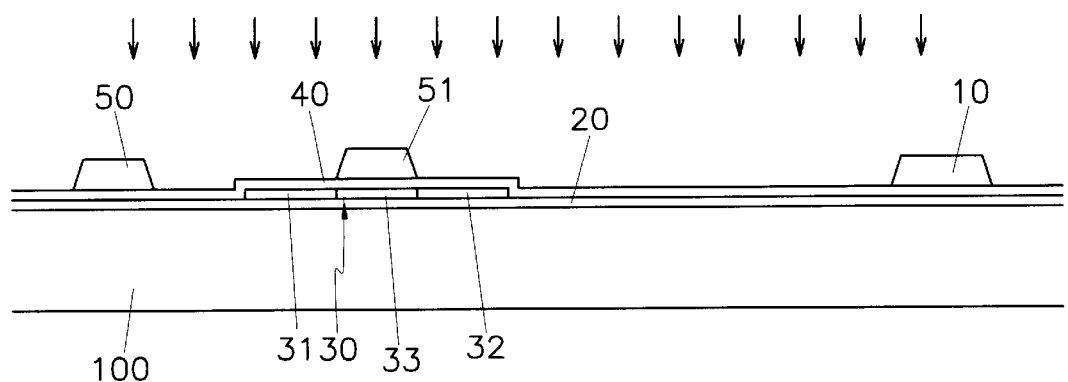
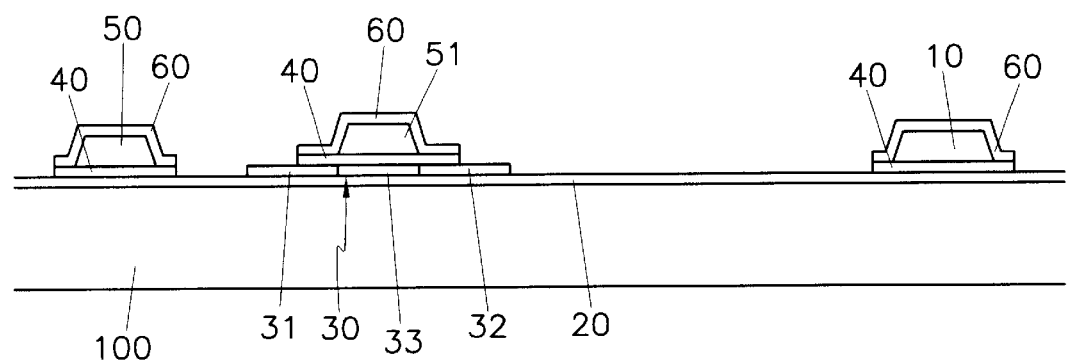

THIN FILM TRANSISTOR ARRAY PANEL FOR A LIQUID CRYSTAL DISPLAY AND A METHOD FOR MANUFACTURING THE SAME

BACKGROUND OF THE INVENTION (a) Field of the Invention

The present invention relates to a thin film transistor (TFT) array panel for a liquid crystal display (LCD) and a method for manufacturing the same.

(b) Description of the Related Art

Thin film transistors, which are typically used as a switching element in each pixel of an LCD, have an amorphous silicon layer or a polysilicon layer as an active layer.

The polysilicon thin film transistor, because it has a higher carrier mobility compared to the amorphous silicon thin film transistor, may narrow the widths of signal lines for driving the pixels and may be used in a large-scale, high-quality LCD since a driving circuit may be integrated on the substrate of an LCD. Also, because the driving circuit can be formed on the substrate, the overall cost for manufacturing the LCD may be reduced and the overall LCD size may be reduced.

This liquid crystal display using the polysilicon thin film transistor generally includes a first substrate having a plurality of thin film transistors, and a second substrate having a plurality of red, green and blue color filters. Also, a second substrate has a black matrix having an opening that defines a pixel which serves as a light shield for the regions between adjacent pixels where the electric field cannot fully control the liquid crystal layer.

However, the black matrix decreases the aperture ratio of the LCD because it covers a wider area than is necessary for covering the light leakage in order to compensate for misalignment between the two substrates. To avoid this problem, it is suggested that the black matrix be formed on the first substrate. However, this method increases the total number of processes in manufacturing the LCD because an align key must be formed on the second substrate to align the first substrate and the second substrate.

SUMMARY OF THE INVENTION

It is an object of the present invention to provide a TFT array panel for an LCD and a method of manufacturing the same in which the manufacturing method is simplified, and an aperture ratio of the LCD is increased.

To achieve the above object, the present invention provides a TFT array panel for LCDs that a pixel electrode overlaps insulatedly a storage electrode, functioning as a shield that prevents light leakage around the data line. Methods of Manufacturing a TFT array panel for an LCD are also provided.

BRIEF DESCRIPTION OF THE DRAWINGS

Further objects and other advantages of the present invention will become apparent from the following description in conjunction with the attached drawings, in which:

FIGS. 5A to 5G are cross-sectional views of a polysilicon TFT array panel as it undergoes sequential manufacturing processes using a method of a preferred embodiment of the present invention.

DETAILED DESCRIPTION OF THE PREFERRED EMBODIMENTS

Figure 1:
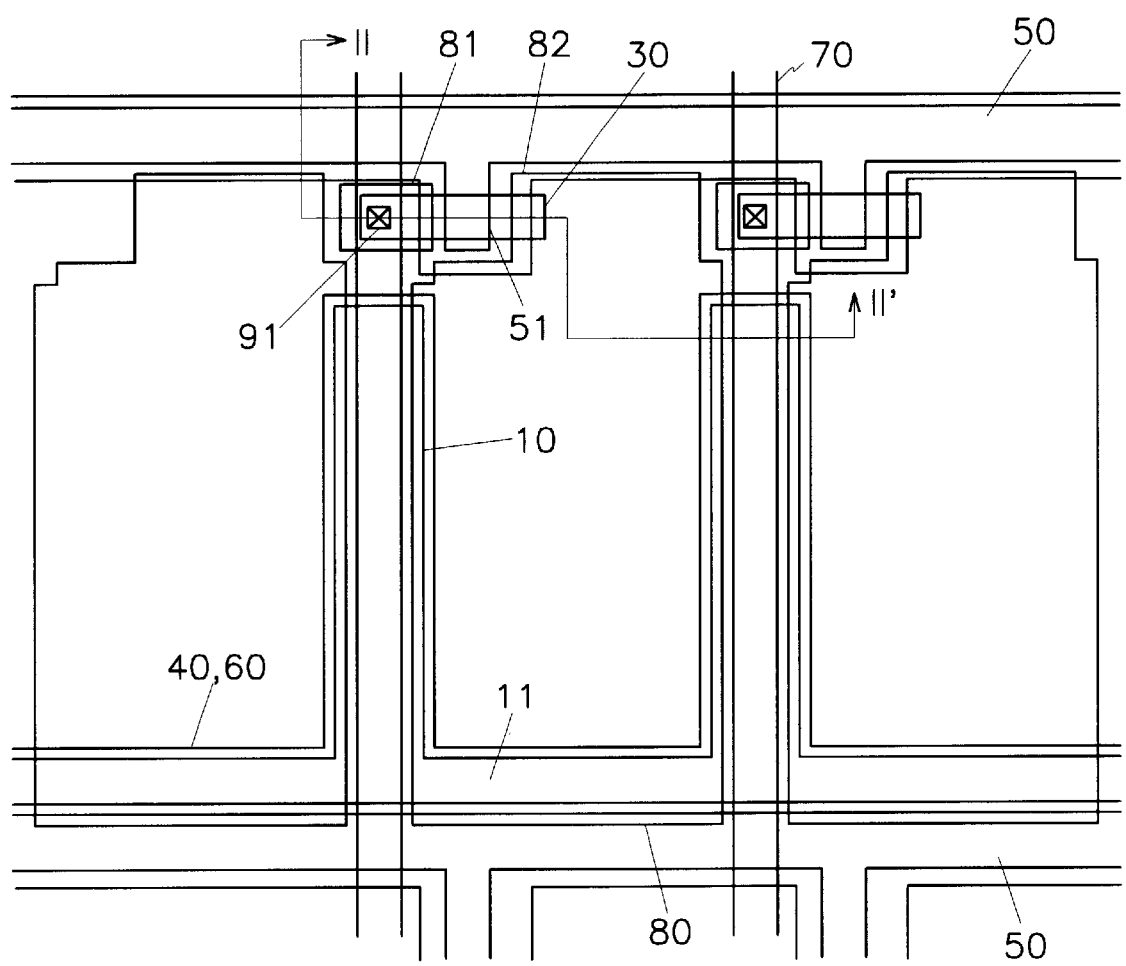
FIG. 1 is layout view of a polysilicon TFT array panel according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
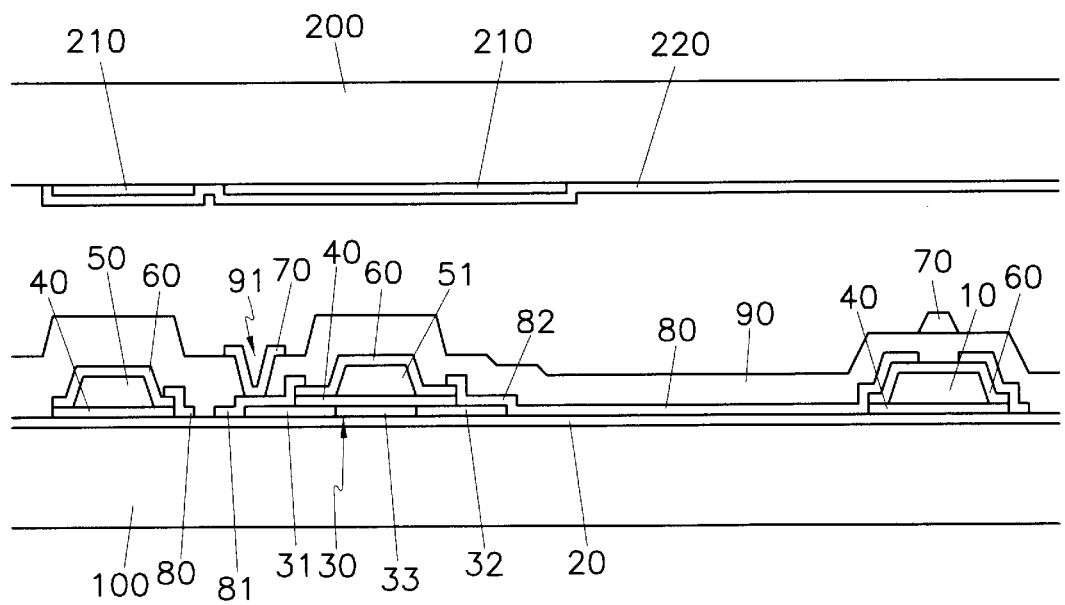
FIG. 2 is a cross-sectional view taken along line II–II' of FIG. 1.

FIG. 1 is a layout view of a polysilicon TFT array panel according to a first embodiment of the present invention, and FIG. 2 is a cross-sectional view taken along line II–II' of FIG. 1. In FIG. 2, both a TFT substrate and a color filter substrate are shown. A pixel in FIG. 1 is a region defined by the intersection of a data line and a gate line.

As shown in FIGS. 1 and 2, a buffer layer 20 made of silicon nitride ($SiN_x$) or silicon oxide ($SiO_2$) is formed on a lower insulating substrate 100 of glass, quartz, or sapphire. The buffer layer 20 protects source and drain regions of doped polysilicon from overetching, and prevents the impurities of the lower insulating substrate 100 from contaminating other layers of the lower insulating substrate 100.

A polysilicon layer 30 is formed on the buffer layer 20. The polysilicon layer 30 includes an undoped channel region 33 located at the center of the polysilicon layer 30, and the source region 31 and the drain region 32 doped with N or P-type impurities. The source region 31 and the drain region 32 are located opposite to each other with respect to the channel region 33. A plurality of gate insulating layers 40 are formed on the polysilicon layer 30 and on the buffer layer 20 between pixels.

A plurality of gate lines 50 are formed on the gate insulating layer 40 in a horizontal direction (in FIG. 1), and a plurality of gate electrodes 51, which are branched from the gate lines 50, overlap the channel region 33 of the polysilicon layer 30. A plurality of storage electrodes 10 are formed in a vertical direction (in FIG. 1) on the gate insulating layer 40. The storage electrodes 10 are connected to a storage line 11, which is parallel to the gate lines 50. Here, the gate lines 50, the storage line 11 and the storage electrodes 10 are formed on the same layer.

A plurality of first insulating layers 60, having widths substantially the same as the gate insulating layer 40 and covering the gate lines 50, the gate electrodes 51, the storage electrodes 10 and the storage line 11, are formed on the gate insulating layers 40. Portions of the source region 31 and the drain region 32 of the polysilicon layer 30 are covered by the first insulating layer 60 and the gate insulating layer 40, while remaining portions of the source region 31 and the drain region 32 of the polysilicon layer 30 are left exposed. Source ITO electrode 81 and drain ITO electrode 82 made of indium tin oxide are formed on the exposed portions of the source region 31 and the drain region 32. A pixel electrode 80, integrally connected to the drain ITO electrode 82, is formed on the buffer layer 20. Here, longitudinal edge portions of both sides of the pixel electrode 80 overlap edge portions of the storage electrodes 10, and a lower portion of the pixel electrode 80 overlaps the storage line 11 and the lower gate line 50.

A second insulating layer 90 is formed covering the source ITO electrode 81, the drain ITO electrode 82 and the pixel electrode 80. The second insulating layer 90 has a contact hole 91 exposing a portion of the source ITO electrode 81.

A plurality of data lines 70, transmitting data signals and defining pixels by intersecting the gate line 50, is formed on the second insulating layer 90. The data lines 70 are connected to the source ITO electrode 81 through the contact hole 91 of the second insulating layer 90. The data lines 70 are located between adjacent pixel electrodes 80 and overlap the storage electrodes 10.

A black matrix 210 is formed on an upper insulating substrate 200 facing to the lower substrate 100. The black matrix 210 is provided on the upper insulating substrate 200 at a position corresponding to the location of the thin film transistor comprises the polysilicon, layer 30, the source and drain ITO electrodes 81 and 82, the gate electrode 51, and the gate lines 50. Furthermore, a common electrode 220 is formed over an entire surface of the upper substrate 200 covering the black matrix 210 as well.

In the polysilicon liquid crystal display of the first embodiment according to the present invention, the storage electrodes 10 act as a black matrix by preventing the light leakage between pixels. Accordingly, as shown in FIG. 2, it is not necessary to form a black matrix in the longitudinal direction on the upper substrate 200. Therefore, by forming the storage electrodes 10, which can act as a black matrix, of a minimal width on the lower substrate 100, an aperture ratio of the LCD may be increased without misalignment problems in the longitudinal direction between the two substrates 100 and 200.

In the first embodiment according to the present invention, as shown in FIG. 2, the pixel electrode 80 is covered by the second insulating layer 90. The second insulating layer 90 may decrease the intensity of the electric field generated between the pixel electrode 80 and the common electrode 220, which drives a liquid crystal layer interposed between the upper substrate 100 and the lower substrate 200.

To solve this problem, the second insulating layer 90 may be removed from the areas covering the pixel electrodes 80. This will be described in detail hereinafter.

Figure 3:
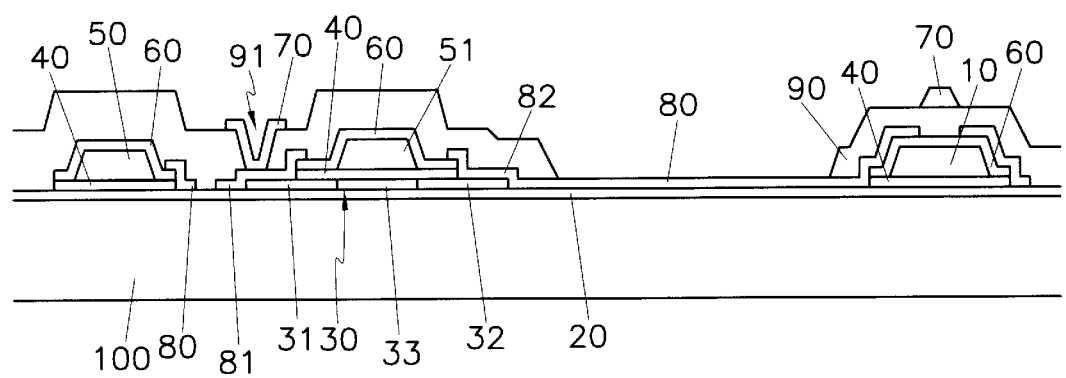
FIGS. 3 and 4 are cross-sectional views of a polysilicon TFT array panel according to second and third embodiments, respectively, of the present invention.

FIG. 3 is a cross-sectional view of a polysilicon TFT array panel according to a second embodiment of the present invention.

As shown in FIG. 3, most of the structure of the polysilicon TFT array panel of to the second embodiment is similar to that of the TFT array panel shown in FIG. 2. However, the second embodiment exposes the pixel electrode 80 by removing the second insulating layer 90 on it.

Another problem in the structure of the first (and second) embodiment as shown in FIG. 1 is that the data lines 70 formed on the second insulating layer 90 are exposed. This may shorten signal lines with the data lines 70 in the area where the signal lines are densely formed. To solve this problem, an insulating layer may be added. Such a structure will be described in detail hereinbelow.

Figure 4:
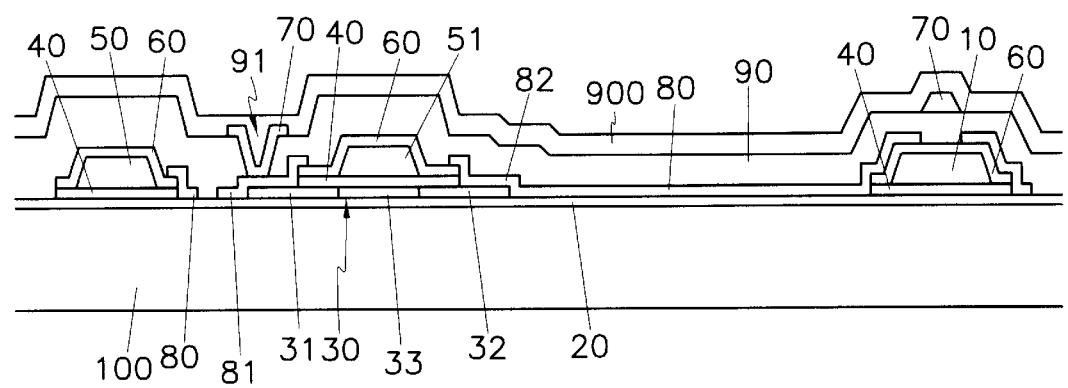

FIG. 4 is a cross-sectional view of a polysilicon TFT array panel according to a third embodiment of the present invention.

As shown in FIG. 4, most of the structure of the polysilicon TFT array panel according to the third embodiment is similar to that of the first embodiment. However, a third insulating layer 900 is formed covering the uppermost elements of the panel. That is, the third insulating layer 900 covers the data line 70, the second insulating layer 90, and the contact hole 91.

In the structure according to third embodiment, the third insulating layer 900 covering the data lines 70 prevents the data lines 70 from shortening with signal lines, even if the signal lines are densely formed on the same layer that the data lines 70 are formed.

A method for manufacturing a thin film transistor array panel according to the first embodiment through the third embodiment of the present invention will now be described with reference to the FIGS. 5A to 5G and FIGS. 1 to 3.

FIGS. 5A to 5G are cross-sectional views of a polysilicon TFT array panel as it undergoes sequential manufacturing processes using a method of a preferred embodiment of the present invention.

First, as shown in FIG. 5A, a buffer layer 20 of silicon nitride ($SiN_x$) or silicon oxide ($SiO_2$) and a silicon layer of amorphous or microcrystalline silicon are sequentially deposited on a lower insulating substrate 100 of glass, quartz, or sapphire. At this time, the silicon layer is formed using a PECVD (plasma enhanced chemical vapor deposition), a LPCVD (low pressure chemical vapor deposition) or a sputtering method to a thickness of 500–1, 000 Å. The silicon layer is then crystallized by laser irradiation, rapid thermal treatment or annealing to form a polysilicon layer 30.

Next, as shown in FIG. 5B, the polysilicon layer 30 is patterned, and a gate insulating layer 40 of silicon nitride ($SiN_x$) or silicon oxide ($SiO_2$) is formed covering the polysilicon layer 30 and the buffer layer 20. Next, a gate conductive material is deposited and etched to form a gate wire and a storage wire. The gate wire includes a gate line 50, a gate electrode 51 branched from the gate line 50, and the storage wire includes a storage electrode 10 and a storage line 11 (see FIG. 1).

Next, as shown in FIG. 5C, N or P-type impurities are implanted in the polysilicon layer 30 by using the gate electrode 51 as a mask to form an undoped channel region 33 located at the center of the polysilicon layer 30, and the source region 31 and the drain region 32 doped with N or P-type impurities. The source region 31 and the drain region 32 are located on opposite sides of the channel region 33. At this time, if MOS transistors of N or P type for driving circuits are formed at the boundaries of the lower substrate 100, one or more photolithography processes and one or more ion-implanting processes may be added.

Next, as shown in FIG. 5D, a first insulating layer 60 of silicon nitride or silicon oxide is deposited and then patterned together with the gate insulating layer 40 to expose the source region 31 and the drain region 32. Here, the portion of the first insulating layer 60 covering the gate line 50, gate electrode 51, storage electrode 10, and storage line 11 is left remaining with the corresponding gate insulating layer 40.

Figure 5E:
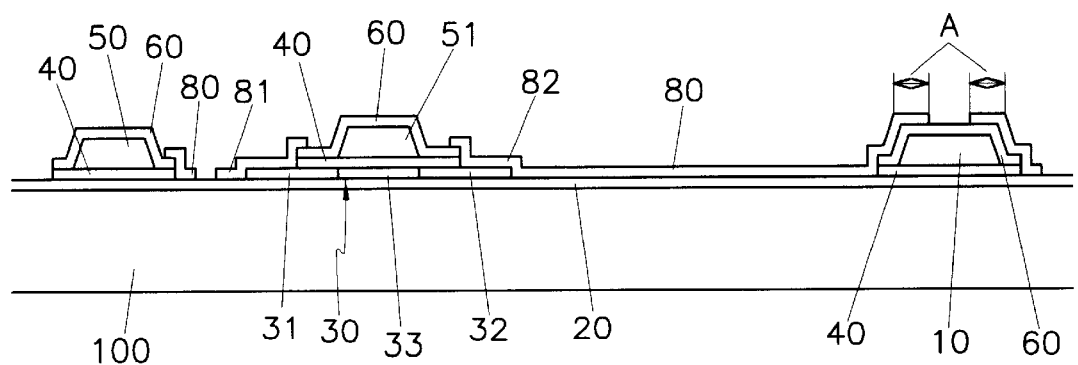

Next, as shown in FIG. 5E, indium tin oxide is deposited and patterned to form a pixel pattern including source and drain ITO electrodes 81 and 82, and a pixel electrode 80 connected to the drain ITO electrode 82. At this time, as shown in FIG. 5E, longitudinal edge portions of both sides of the pixel electrode 80 overlap portions of storage electrodes 10 to form storage capacitors A.

Figure 5F:
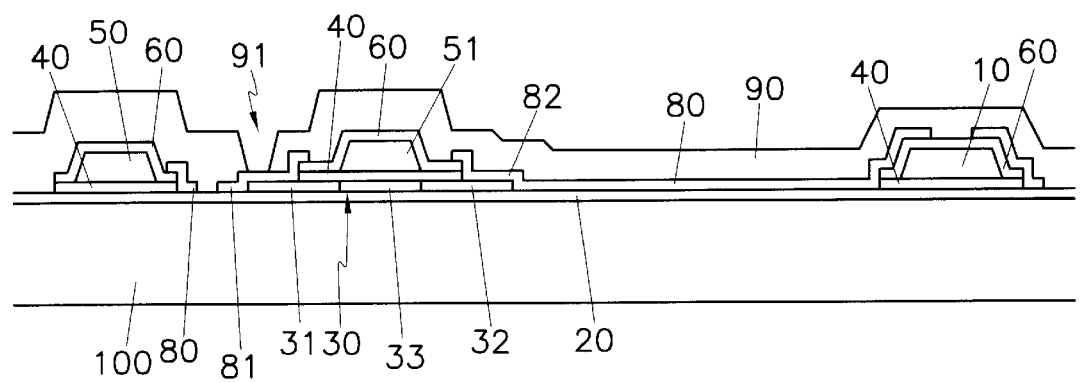
Figure 5G:
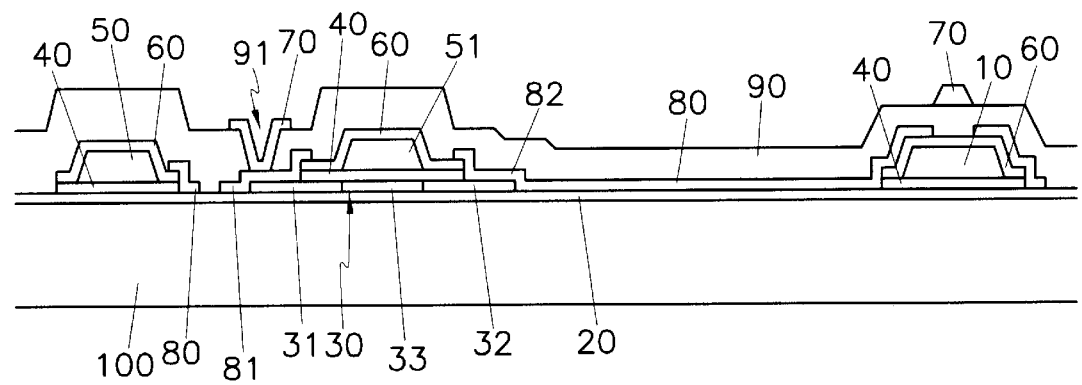

Next, as shown in FIG. 5F, a second insulating layer 90 of silicon nitride or silicon oxide is deposited and patterned to form a contact hole 91 exposing the source ITO electrode 81.

Finally, a conductive material is deposited and patterned to form a data line 70 defining pixels by intersecting with the gate line 50. The data line 70 is connected to the source ITO electrode 81 through the contact hole 91.

Here, to manufacture the thin film transistor array panel according to the second embodiment as shown in FIG. 3, the pixel electrode 80 is exposed by patterning the second insulating layer 90 simultaneously when forming the contact hole 91.

Furthermore, to manufacture the thin film transistor array panel according the third embodiment as shown in FIG. 4, a step of forming a third insulating layer 900 covering the data line 70, the second insulating layer 90, and the contact hole 91 by depositing silicon nitride or silicon oxide is added.

In the method of manufacturing a polysilicon TFT array panel according to a preferred embodiment of the present invention, it is desirable that the pixel electrode 80 and the data line 70 do not overlap to minimize parasitic capacitance generated between the pixel electrode 80 and the data line 70. This is realized by making the width of the data line 70 smaller than that of the storage electrode 10, and forming the data line 70 in the boundary of the storage electrode 10.

Furthermore, if there is sufficient storage capacitance, it is possible to omit the forming of the storage line 11. In this case, the storage electrodes 10 are connected to the lower gate line 50.

In the TFT array panel for liquid crystal displays according to the present invention, by forming the storage electrodes such that they function as a black matrix to prevent the leakage of light between pixels on the lower substrate, and a black matrix in only the horizontal direction on the upper substrate, the aperture ratio of the LCD may be increased without encountering misalignment problems between the two substrates, and the manufacturing method may be simplified by reducing the number of manufacturing steps.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A panel for a liquid crystal display, comprising:
    an insulating substrate;
    a plurality of gate lines formed on the insulating substrate and transmitting scanning signals;
    a plurality of storage electrodes formed on the insulating substrate;
    a plurality of pixel electrodes formed on the insulating substrate, each pixel electrode being insulated from the storage electrodes and having an edge overlapping the storage electrodes to form storage capacitance;
    a plurality of data lines, each data line overlapping the storage electrodes, insulated from the storage electrodes and intersecting the gate lines; and
    a plurality of switching elements each including a first terminal, a second terminal and a third terminal connected to the gate lines, the data lines and the pixel electrodes, respectively, wherein the plurality of storage electrodes are laterally separated from the plurality of switching elements.

2. The panel of claim 1, wherein the data lines are formed on a boundary of the storage electrodes.

3. The panel of claim 2, wherein the pixel electrodes and the data lines do not overlap.

4. A panel for a liquid crystal display, comprising:
    an insulating substrate;
    a semiconductor layer having a first region located at the center of the semiconductor layer, and second and third regions located on opposite sides of the first region;
    a gate insulating layer covering the first region and exposing predetermined portions of the second and third regions;
    a gate wire formed on the gate insulating layer and including a plurality of gate lines transmitting scanning signals, and a plurality of gate electrodes located over the first region of the semiconductor layer;
    a plurality of storage electrodes formed on the gate insulating layer and separated from the gate lines;
    a first insulating layer formed on the gate insulating layer covering the gate wire and the storage electrodes, and exposing the portions of the second and the third regions;
    a plurality of pixel patterns including a plurality of source and drain electrodes formed on the second and the third regions of the semiconductor layer, and a plurality of pixel electrodes coupled to the drain electrodes, wherein each pixel electrode is isolated from the storage electrode and has an edge overlapping the storage electrodes;
    a second insulating layer covering the pixel patterns and having a contact hole exposing the source electrodes; and
    a plurality of data lines, each data line insulated from and overlapping the storage electrodes on the second insulating layer, and connected to the source electrodes through the contact hole.

5. The panel of claim 4, further comprising a storage line that is connected to the storage electrodes, formed on the gate insulating layer, and parallel with the gate lines.

6. The panel of claim 5, wherein the entire insulating substrate is covered with a buffer layer.

7. The panel of claim 6, wherein the second insulating layer is removed on the pixel electrodes.

8. The panel of claim 6, further comprising a third insulating layer covering the second insulating layer and the data lines.

9. The panel of claim 8, wherein the semiconductor layer is made of polysilicon.

10. The panel of claim 4, wherein the first region of the semiconductor layer is undoped, and the second and third regions are doped with N or P-type impurities.

11. A liquid crystal display, comprising:
    a first insulating substrate including:
        a plurality of gate lines transmitting scanning signals,
        a plurality of storage electrodes insulated from and overlapping the data lines,
        a plurality of pixel electrodes, each having edge portions that are insulated from and overlapping the storage electrodes to form storage capacitance,
        a plurality of data lines intersecting the gate lines and transmitting data signals, and
        a plurality of switching elements, each including a first terminal, a second terminal and a third terminal connected to the gate lines, the data lines and the pixel electrodes, respectively, wherein the plurality of storage electrodes are laterally separated from the plurality of switching elements; and a second insulating substrate including a black matrix formed over a portion corresponding only to the gate lines and the switching elements.

12. A method for manufacturing a thin film transistor array panel for a liquid crystal display, comprising the steps of:

forming a semiconductor layer on an insulating substrate;

forming a gate insulating layer covering the semiconductor layer;

forming a gate wire and a storage wire, wherein the gate wire includes a plurality of gate lines and gate electrodes branched from the gate lines on the gate insulating layer, and wherein the storage wire includes a plurality of storage electrodes and storage lines connected to the storage electrodes;

forming a first insulating layer covering the gate wire and the storage wire;

patterning the gate insulating layer and the first insulating layer to expose portions on opposite sides of the semiconductor layer;

forming a pixel pattern including a source electrode and a drain electrode respectively connected to the exposed opposite portions of the semiconductor layer, and a plurality of pixel electrodes each connected to one of the drain electrodes;

forming a second insulating layer covering the pixel pattern;

patterning the second insulating layer to form a contact hole exposing the source electrodes; and forming a plurality of data lines connected to the source electrodes through the contact holes.

13. The method of claim 12, wherein the semiconductor layer is made of polysilicon.

14. The method of claim 13, further comprising the step of ion-implanting impurities by using the gate electrodes as a mask to form an undoped channel region in the semiconductor layer, and to form a source region and a drain region, the source region being located on one side of the channel region and the drain region being located on an opposite side of the channel region.

15. The method of claim 14, further comprising the step of forming a buffer layer directly on an entire surface of the insulating substrate.

16. The method of claim 15, further comprising the step of patterning the second insulating layer to expose the pixel electrode.

17. The method of claim 15, further comprising the step of forming a third insulating layer covering the data lines.

* * * * *